G. MUELLER.
WHEELED OVEN TRAY OR CARRIAGE.
APPLICATION FILED AUG. 23, 1920.
1,420,567.
Patented June 20, 1922.
3 SHEETS—SHEET 1.
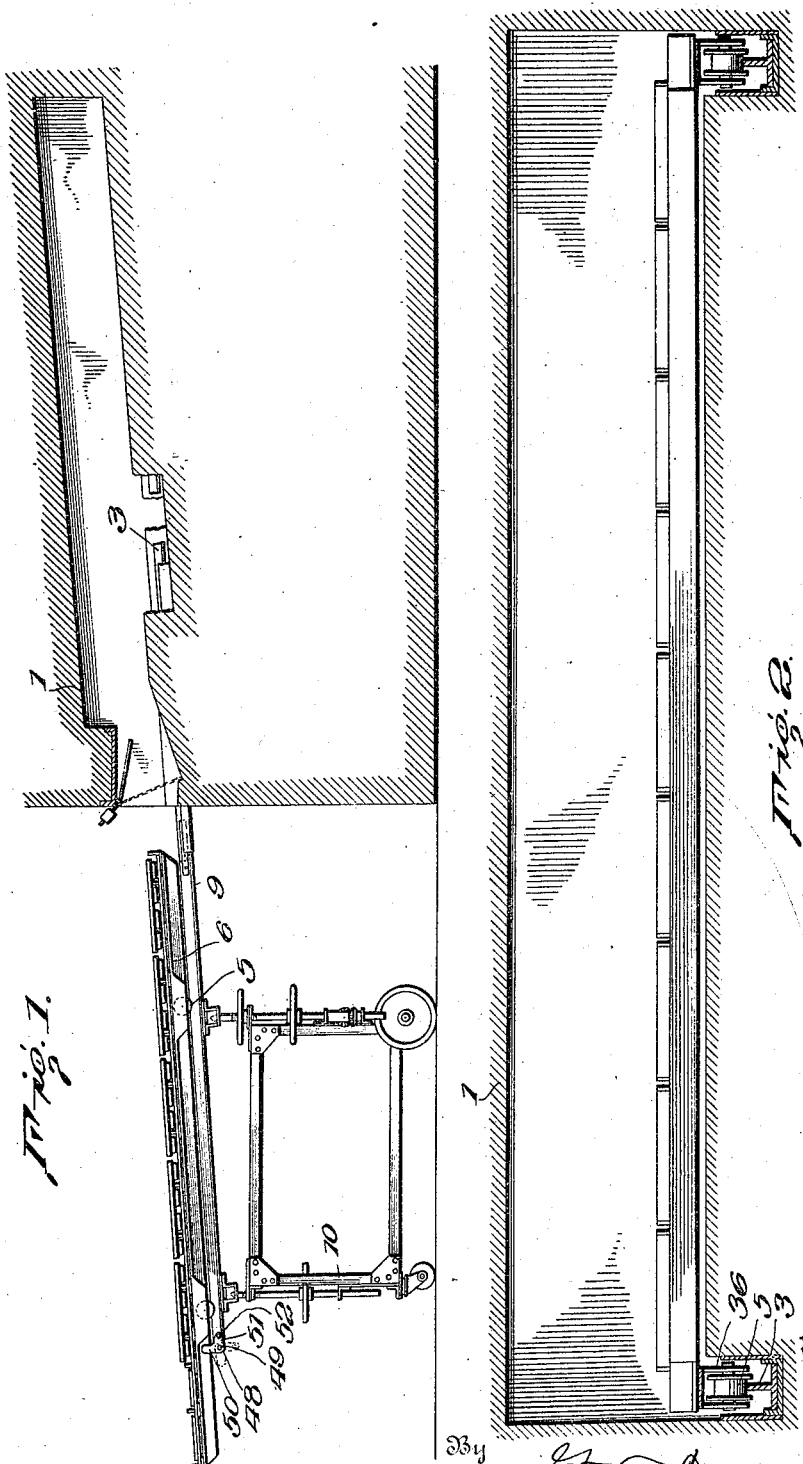

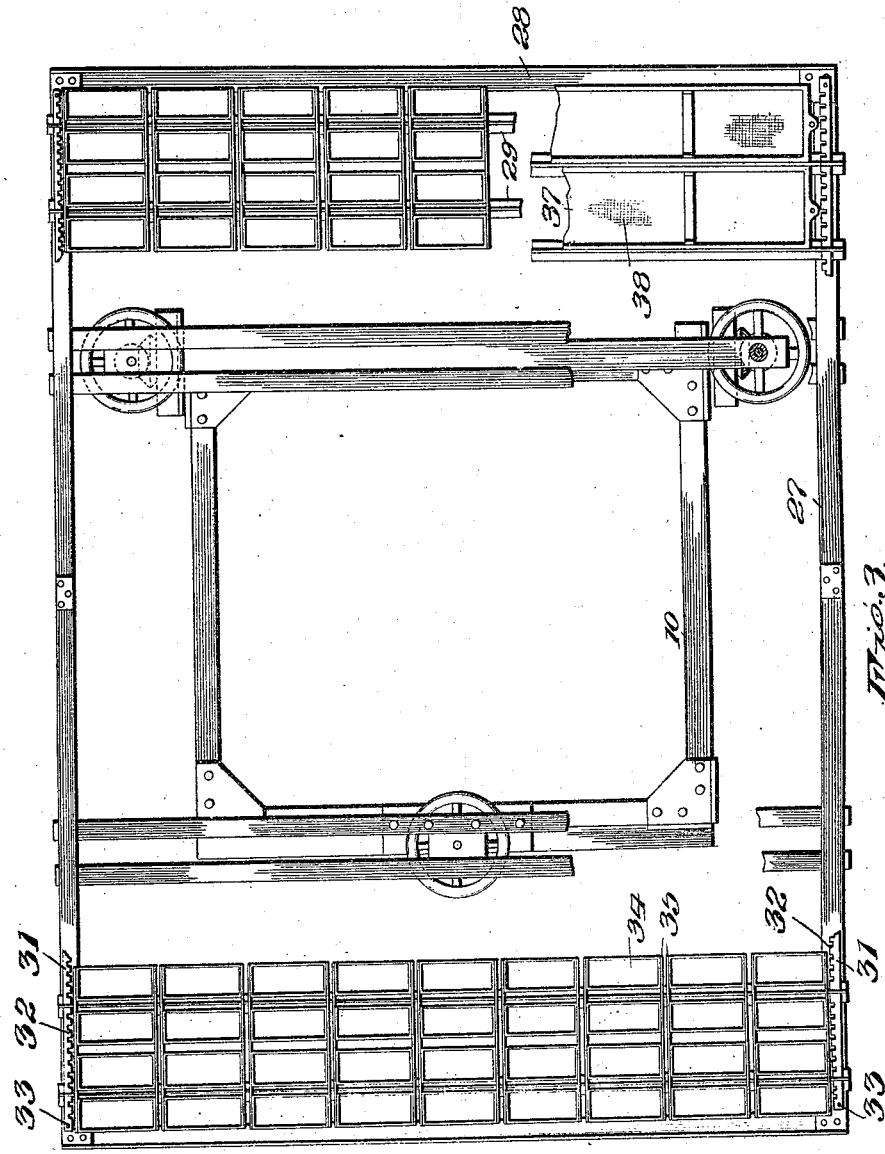

G. MUELLER.
WHEELED OVEN TRAY OR CARRIAGE.
APPLICATION FILED AUG. 23, 1920.
1,420,567.
Patented June 20, 1922.
3 SHEETS—SHEET 3.
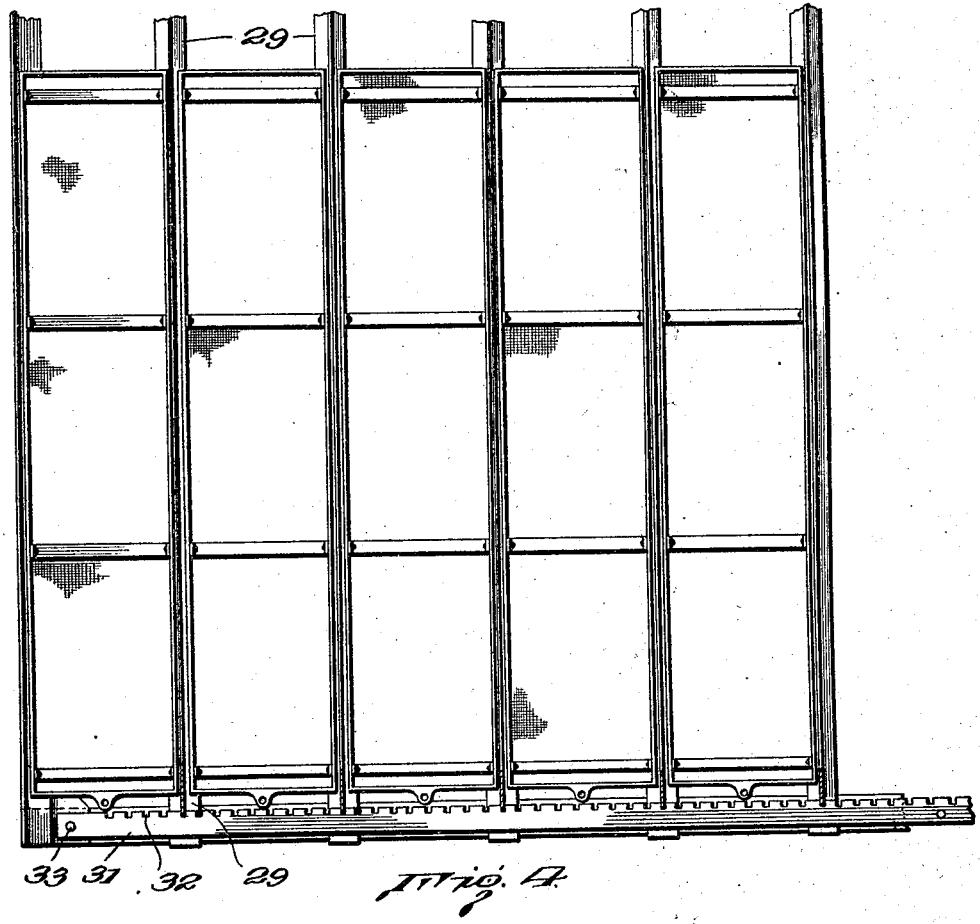
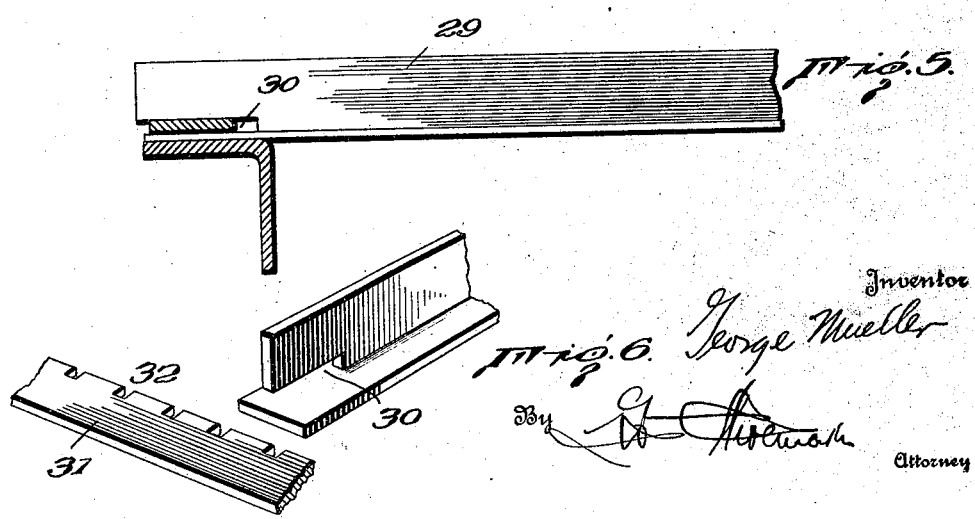

UNITED STATES PATENT OFFICE.

GEORGE MUELLER, OF SALT LAKE CITY, UTAH.

WHEELED OVEN TRAY OR CARRIAGE.

1,420,567.          Specification of Letters Patent.    Patented June 20, 1922.

Original application filed August 23, 1920, Serial No. 405,362. Divided and this application filed August 23, 1920. Serial No. 405,363.

*To all whom it may concern:*

Be it known that I, GEORGE MUELLER, a citizen of the United States, residing at Salt Lake City, in the county of Salt Lake and State of Utah, have invented new and useful Improvements in a Wheeled Oven Tray or Carriage, of which the following is a specification.

The invention relates to a wheeled oven tray or carriage and is a division of a copending application filed by me the 23rd day of August, 1920, Serial No. 405,362.

The object of the present invention is to provide an efficient oven tray or carriage of strong and durable construction designed particularly for the baker's oven of the aforesaid application but adapted for use in analogous or similar structures equipped with means for supporting pans or receptacles arranged singly or in sets and adapted when it is run into an oven to support the pans or receptacles in spaced relation to the floor to enable the heating and baking effect to be the same as if the pans or receptacles were placed directly upon the oven floor.

A further object of the invention is to provide a tray of this character adapted to support pans or receptacles in a position directly exposed to the heat of the floor of the oven without any intervening draw-plate or similar element and capable of enabling the pans or receptacles to be quickly run into and out of the oven with practically no loss of heat.

Another object of the invention is to provide a wheeled tray or carriage adapted to eliminate the hard labor incident to peeling in and out of a hot bake oven and capable of enabling a large batch of loaves or similar material to be readily handled in placing the same into the oven and in removing the material therefrom and adapted also to enable a product to be produced equally as good as that resulting from hand peeling and with much the same principle of handling the loaves or rolls or the like.

Another object of the invention is to provide a tray or carriage adapted to be readily and accurately handled by an operator having little experience and thereby obviating the necessity of employing an expert baker or peelman for such purpose.

The invention also has for its object to provide a wheeled tray or carriage equipped with parallel or supporting means capable of ready adjustment for accommodating pans or receptacles of different sizes.

With these and other objects in view, the invention consists in the construction and novel combination of parts hereinafter fully described, illustrated in the accompanying drawings and pointed out in the claims hereto appended, it being understood that various changes in the form, proportion, size and minor details of construction, within the scope of the appended claims, may be resorted to without departing from the spirit of the invention or sacrificing any of the advantages thereof.

In the accompanying drawings, in which like numerals of reference designate corresponding parts in the several figures:—

Figure 1 is a side elevation of a wheeled carriage or tray constructed in accordance with this invention and shown supported upon an oven truck in position to be run into a baker's oven, the latter being in section.

Figure 2 is a transverse sectional view showing the tray or carriage in position in the oven.

Figure 3 is a plan view of the tray or carriage.

Figure 4 is an enlarged horizontal sectional view through a portion of the tray or carriage illustrating the manner of adjustably securing the supporting bars.

Figure 5 is an enlarged vertical sectional view of the same taken longitudinally of one of the supporting bars.

Fig. 6 is an enlarged perspective view showing the connection between the pan supporting bars and the locking strips.

In the accompanying drawings in which is illustrated the preferred embodiment of the invention, 6 designates a pan carrying tray or carriage provided with wheels 5 arranged to run on rails 3 of a baking chamber 1 of the baker's oven described in the aforesaid application and also on rails 9 of an oven truck 10 also described in the aforesaid application.

The wheels of the tray or carriage are preferably ball bearing but any anti-friction wheel or wheels of any construction may of course be employed and the tray comprises an open rectangular frame composed of side bars 27 and connecting end bars 28 and having adjustable pan supporting bars 29 mounted upon the said side bars and extending entirely across the frame of the tray. The pan supporting bars 29 are preferably inverted T-shape and are provided in their webs with lower terminal recesses 30 adapted to receive adjusting and locking strips or members 31 and engaging recesses 32 thereof. The locking strips or members 31, which are arranged horizontally at opposite sides of the wheeled tray, have the notches 32 cut in their inner edges for engaging the webs of the pan supporting bars or rails and the adjusting bars or members are adjustably secured to the frame of the wheeled tray by bolts 33, or other suitable fastening means. Any suitable means may be employed for enabling the adjusting strips or members to be adjustably mounted on the side bars of the tray and the arrangement of the pans may be reversed if desired and the bars 29 may extend either longitudinally or transversely of the tray as will be readily understood.

The pans 34 which are spaced apart are connected in sets by end bars 35 and they are spaced apart to permit the connecting end bars to rest upon the upper edges of the vertical portions of the T-shaped supporting bars 29. The pans are hung from the supporting bars and are arranged so that when the tray runs into the furnace the bottom of the pans will just clear the floor of the oven, a quarter or one-half inch of clearance being sufficient and also arranging the pans in sufficiently close relation with the floor of the oven so that there will be practically the same heating effect as when the pans are placed directly upon the oven floor. The wheels of the tray are preferably flanged as shown to form grooves to receive the rails of the oven truck and oven and they may be mounted in any suitable brackets or supports 36.

The pans may be of any desired construction and the supporting bars 29 are also adapted to receive, on their base portions, biscuit or bread trays 37 having a wire mesh bottom 38 and adapted for baking biscuits, rolls and the like. The wire mesh will enable the contents of the biscuit or bread trays to bake as quickly as if they were lying on the bottom of the oven. The wire mesh pan or tray is adapted to avoid the labor of peeling the rolls or biscuits in and out by hand on a wooden peel holding from 20 to 25 rolls and requiring from fifteen to twenty-five minutes to peel an oven full. By employing the wheeled tray and the screen or perforated bottom pan or tray, an entire oven-full of rolls, bread or the like may be introduced into an oven or removed therefrom within the space of about one-half a minute. No claim is made, in the present application, to the particular construction of the foraminous or perforated bottom pan or tray or to the oven and oven truck.

The rails 9 of the oven truck are provided with pivoted stops 48 preferably constituting the approximately L-shaped plates or members pivoted at their angles at 49 and having upwardly extending arms or portions 50 for engaging the brackets or other portions of the wheeled tray or carriage to retain the same on the oven truck. The stop plates, which also have inwardly extending arms 51, are provided with perforations 52 adapted to receive pins or bolts for securing the pivoted stops in full line position shown in Figure 1 of the drawings and also adapted when removed to permit the pivoted stops to be swung downwardly to the dotted line position for removing the wheeled tray from the oven tray.

A single wheeled tray will enable a large number of rolls to be quickly handled and the rolls may be rapidly placed on the wheeled tray or carriage. It has been found in practice that a wheeled tray handling between 200 and 250 loaves, requires only about one-half a minute for introducing the tray or carriage into the baking chamber and that less time is required for the removal of the tray.

What is claimed is:—

1. An oven tray comprising an open frame, adjustable pans or receptacles, supporting bars mounted upon the said frame and adapted to be arranged at different intervals, and adjusting members secured to the frame and detachably engaging the supporting bars and securing the same in their adjustments.

2. An oven tray comprising an open frame, adjustable pans or receptacles, supporting bars mounted upon the said frame and adapted to be arranged at different intervals, and adjusting strips or members mounted on the frame and provided at intervals with recesses receiving and engaging the ends of the supporting bars and detachably securing the same in their adjustments.

3. An oven tray comprising an open frame, approximately inverted T-shaped supporting bars detachably mounted on the frame, and adjusting strips or members mounted on the frame at the ends of the bars and provided at intervals with recesses receiving the webs of the supporting bars and retaining the latter in their adjustments.

4. An oven tray comprising an open frame, inverted T-shaped bars mounted upon the supporting frame and provided in the terminals of their webs with lower recesses, and adjusting strips or members mounted upon the frame at the ends of the bars and fitting in the said recesses and provided at intervals with notches engaging the webs of the supporting bars for retaining the latter in their adjustments.

5. The combination of an open frame, inverted T-shaped supporting bars arranged at intervals upon the said frame, pans or receptacles located between the supporting bars and connecting bars secured to the pans and connecting the same in sets and arranged upon the supporting bars.

In witness whereof, I have hereunto affixed my signature.

GEORGE MUELLER.